(12) United States Patent
Rousseau et al.

(10) Patent No.: US 6,535,675 B1
(45) Date of Patent: Mar. 18, 2003

(54) OPTICAL FIBER HAVING A CHROMATIC DISPERSION SLOPE THAT IS SHALLOW

(75) Inventors: Jean-Claude Rousseau, Chatou (FR); Marianne Paillot, Asnieres (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/471,688

(22) Filed: Dec. 23, 1999

(30) Foreign Application Priority Data

Jan. 4, 1999 (FR) .............................. 99 00007

(51) Int. Cl.[7] .............................. G02B 6/02; G02B 6/16
(52) U.S. Cl. .................... 385/123; 385/126; 385/127
(58) Field of Search .............................. 385/124, 126, 385/123, 127; 359/161

(56) References Cited

U.S. PATENT DOCUMENTS

| | | | |
|---|---|---|---|
| 5,568,583 A | 10/1996 | Akasaka et al. | 385/123 |
| 5,673,354 A | 9/1997 | Akasaka et al. | 385/127 |
| 5,684,909 A | * 11/1997 | Liu | 385/127 |
| 5,838,867 A | 11/1998 | Onishi et al. | 385/123 |

FOREIGN PATENT DOCUMENTS

EP 0 883 002 A1 12/1998

OTHER PUBLICATIONS

Youwei Li et al: "Triple–Clad Single–Mode Fibers for Dispersion Flattening" Optical Engineering, vol., 33, No. 12, Dec. 1, 19994, pp. 3999–4005, XP000484832 ISSN: 0091–3286.

Taya–Cho et al.: "Dispersion Flattened Single–Mode Fiber for 10.000 km Transmission System" 16th European Conference on Optical Communication, vol. 1, Sep. 16–20, 1990, pp. 505–507, XP002116517 Amsterdam, The Netherlands.

* cited by examiner

Primary Examiner—Mark A. Robinson
Assistant Examiner—Alessandro V. Amari
(74) Attorney, Agent, or Firm—Sughrue Mion, PLLC

(57) ABSTRACT

The invention relates to a dispersion shifted monomode optical fiber which, in the wavelength range 1400 nm to 1650 nm, presents both a chromatic dispersion maximum and a chromatic dispersion slope of absolute value less than 0.05 ps/nm$^2$·km. Advantageously, the maximum in the wavelength wave 1400 nm to 1650 nm is a single maximum. The fiber also presents dispersion having a slope of absolute value less than 0.03 ps/nm$^2$·km in the wavelength range 1530 nm to 1580 nm. The fiber of the invention is particularly suitable for wavelength division multiplexed transmission systems.

22 Claims, 2 Drawing Sheets

OPTICAL FIBER HAVING A CHROMATIC DISPERSION SLOPE THAT IS SHALLOW

The present invention relates to the field of optical fiber transmission, and more particularly to the field of transmission with wavelength division multiplexing (WDM).

BACKGROUND OF THE INVENTION

In optical fibers, the refractive index profile is generally described in terms of the appearance of the graph of refractive index as a function of the associated radius. Conventionally, distance r from the center of the fiber is plotted along the abscissa and refractive index is plotted up the ordinate in terms of its absolute difference or its percentage different relative to the index of the fiber cladding. Thus, the profile can be said to be "stepped", or "trapezium-shaped", or "triangular", for curves representative of index variation as a function of radius having respectively a stepped shape, a trapezium shape, or a triangular shape. These curves are generally representative of an ideal or reference profile for the fiber, fiber manufacturing constraints possibly leading to a profile that is perceptibly different.

In new high data rate transmission networks using wavelength division multiplexing, it is advantageous to manage chromatic dispersion, particularly at data rates greater than or equal to 10 Gbit/s. The idea is to obtain cummulative chromatic dispersion for all of the wavelengths in the multiplex that amounts substantially to zero over the link, so as to limit the extent to which pulses are broadened. An acceptable value for the cumulative dispersion is a few hundred picoseconds per nanometer (ps/nm). It would also be advantageous to avoid having zero values for chromatic dispersion in the vicinity of the wavelength used in the system since non-linear effects are greater at such values. It is thus preferable to use so-called non-zero dispersion shifted fiber (NZ-DSF) having a zero chromatic dispersion wavelength $\lambda_0$ lying outside the range occupied by the channels of the multiplex so as to avoid problems due to four-wave mixing. In addition, the use of such fibers for WDM systems leads to seeking a chromatic dispersion slope that is shallow, so as to conserve similar propagation characteristics for different channels. From this point of view, the reference value for chromatic dispersion slope is 0.075 ps/nm²·km.

In "Dispersion flattening in a W fiber", published in Applied Optics, Vol. 33, No. 6, pp. 1011–1014 (1994), Richard Lundin describes a method enabling flat dispersion to be obtained in monomode fibers having two cladding layers. The method is applied to fibers having an index profile with a rectangular core and a ring of index lower than that of the cladding, and it makes it possible to obtain a mean value for dispersion of 0.9 ps/km.nm over the wavelength range of 1250 nm to 1600 nm, with a cutoff wavelength of 1250 nm. That document merely states that the fact of maintaining chromatic dispersion at a low value makes it possible to restrict pulse broadening.

In "Triple-clad single mode fibers for dispersion flattening", published in Optical Engineering, Vol. 33, No. 12, pp. 3999–4005 (1994), Y. Li and C. D. Hussey describe the advantage of flat dispersion fibers for WDM transmission systems, with chromatic dispersion reducing to zero at 300 nm and at 1550 nm. That document proposes optimizing triple-clad fibers to obtain flat dispersion, with chromatic dispersion zeros at 1300 nm and at 1550 nm, low intrinsic losses, and good sensitivity to bending. The cutoff wavelength for the second mode is 1250 nm. The fibers that are obtained present a core of index greater than that of the outer cladding, and second cladding of index greater than that of the outer cladding. The losses induced by winding the fiber at a radius of 5 cm are less than 2.4 dB/km, and dispersion is less than 3 ps/nm·km over the 1300 nm to 1550 nm wavelength range.

EP-A-0 368 014 describes another fiber having the same type of profile. Its chromatic dispersion in the range 1280 nm to 1560 nm is less than or equal to 3.5 ps/nm·km, and its sensitivity to bending is less than $10^{-6}$ dB/m for a radius of 5 cm.

EP-A-0 131 634 describes yet another fiber having the same type of profile. That fiber has chromatic dispersion with three dispersion zeros, and opposite maximum and minimum values relating to dispersion between the zeros.

In "Worldwide status of dispersion modified single mode fibers", published in Philips J. Res. 42, 435–450 (1987), P. K. Bachmann proposes a summary of flat dispersion fibers and of dispersion-shifted fibers (DSF). The author concludes that it is necessary to reduce the losses induced by bending the fibers.

OBJECTS AND SUMMARY OF THE INVENTION

The invention proposes a fiber which has characteristics that are appropriate for use in wavelength division multiplexed transmission systems, without inducing large amounts of attenuation, and limiting non-linear effects. The invention applies to all kinds of pulse WDM transmission systems, in particular to RZ or NRZ pulse systems.

More precisely, the invention proposes a dispersion shifted monomode optical fiber which, in a wavelength range of 1400 nm to 1650 nm, presents both a chromatic dispersion maximum and a chromatic dispersion slope of absolute value less than 0.05 ps/nm²·km.

In an embodiment, the maximum is the sole maximum in the wavelength range 1400 nm to 1650 nm.

Preferably, the fiber presents chromatic dispersion having a positive value at said maximum.

In which case, the maximum is advantageously reached at a wavelength lying in the range 1530 nm to 1580 nm.

The fiber may present a chromatic dispersion zero for a wavelength of less than 1450 nm.

Advantageously, it also presents a chromatic dispersion zero for a wavelength greater than 1600 nm.

In another embodiment, the fiber presents chromatic dispersion having a value that is negative at said maximum.

In which case, the maximum is preferably reached at a wavelength lying in the range 1480 nm to 1520 nm.

In addition, in the wavelength range 1530 nm to 1580 nm, the fiber may present chromatic dispersion having a slope that is positive.

In an embodiment, in the wavelength range 1530 nm to 1580 nm, the fiber presents chromatic dispersion having a slope that is negative.

In another embodiment, in the wavelength range 1530 nm to 1580 nm, the fiber presents chromatic dispersion having a slope of absolute value less than 0.03 ps/nm²·km.

Advantageously, at a wavelength of 1300 nm, the fiber presents chromatic dispersion having an absolute value of less than 7 ps/nm·km.

In an embodiment, the fiber presents an index profile having a fiber core and cladding, the core comprising a central portion of index $n_1$ greater than the index $n_s$ of the cladding of the fiber, an annular portion around said central portion and having an index $n_2$ less than the index of the cladding, and a ring around said annular portion of index $n_3$ greater than that of the cladding.

In addition, the fiber further presents another annular portion around said ring, and having an index $n_4$ less than that of the cladding.

Advantageously, the difference between the indices of the central portion and the annular portion lies in the range $13 \times 10^{-3}$ to $17 \times 10^{-3}$.

Preferably, the difference $\Delta n_2$ between the index $n_2$ of the annular portion and the index $n_s$ of the cladding lies in the range $-8 \times 10^{-3}$ to $-6 \times 10^{-3}$.

In an embodiment, the difference $\Delta n_3$ between the index $n_3$ of the ring and the index $n_s$ of the cladding lies in the range $3 \times 10^{-3}$ and $6 \times 10^{-3}$.

Advantageously, the radius $a_1$ of the central portion is less than or equal to 3 µm.

Preferably, the ratio $(a_2-a_1)/a_1$ between the thickness of the annular portion and the radius of the central portion lies in the range 0.8 to 1.2.

In an embodiment, the ratio $(a_3-a_2)/a_1$ between the thickness of the ring and the radius of the central portion lies in the range 0.3 to 0.7.

Provision can also be made for the difference $\Delta n_4$ between the index $n_4$ of the other annular portion and the index $n_s$ of the cladding to lie in the range $-0.5 \times 10^{-3}$ and $-0.1 \times 10^{-3}$.

The invention also provides the use of such a fiber for wavelength division multiplexed transmission systems.

BRIEF DESCRIPTION OF THE DRAWINGS

Other characteristics and advantages of the invention will appear on reading the following description of embodiments of the invention, given purely by way of example, and with reference to the drawing, in which:

FIG. 3b illustrates the dispersion slope curves of the fibers of FIG. 3a.

DETAILED DESCRIPTION

Figure 1:
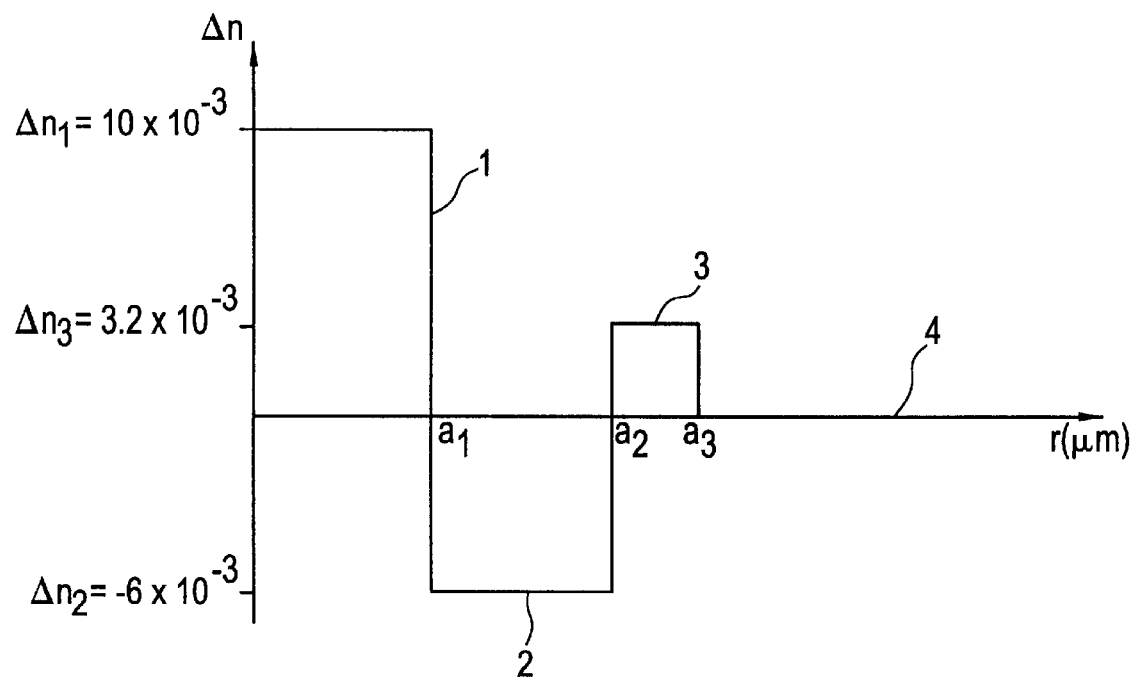
FIG. 1 is an example of an index profile for a fiber of the invention.

The invention proposes a shifted dispersion monomode optical fiber which, in a wavelength range of 1400 nm to 1650 nm, presents both a chromatic dispersion maximum and a chromatic dispersion slope of absolute value less than 0.05 ps/nm²·km.

Advantageously, there is a single chromatic dispersion maximum only in said wavelength range.

At the maximum, the chromatic dispersion can present a value that is positive or negative. If the maximum of the chromatic dispersion presents a value that is positive, the fiber can have a chromatic dispersion zero on either side of the maximum. The position of the dispersion maximum is then preferably selected to lie in the wavelength range of the multiplex, i.e. between 1530 nm and 1580 nm. Advantageously, chromatic dispersion cancels to zero a first time for a wavelength shorter than 1450 nm. It may also cancel a second time for a wavelength longer than 1600 nm. In which case the fiber is an NZ-DSF fiber, i.e. it does not have any dispersion zeros within the wavelength range of the comb, i.e. between 1530 nm and 1580 nm, and it is particularly suitable for use in WDM transmission systems. The non-zero values for the dispersion make it possible to limit non-linear effects, such as four-wave mixing, for example.

If the chromatic dispersion presents a negative value at its maximum, the position of the maximum is advantageously selected so that both the chromatic dispersion and the chromatic dispersion slope are negative in the wavelength range of the multiplex. Thus, if a chromatic dispersion maximum is selected to lie in the range 1480 nm to 1520 nm, and preferably close to 1500 nm, it is possible to obtain both negative chromatic dispersion and negative dispersion slope in the range of the multiplex.

In this case, the advantage is that it is possible in the transmission system to provide dispersion compensation by means of a step index fiber having positive dispersion slope and positive dispersion. There is then no need to use a dispersion-compensating fiber that presents high attenuation and small mode diameter; managing chromatic dispersion in this way is described in the patent application filed by the Applicant on the same day as the present application, and entitled "Système de transmission à fibre optique à multiplexage en longueur d'onde" [A WDM optical fiber transmission system]. Proposals are made therein to use, as the line fiber, a shallow slope fiber with chromatic dispersion whose absolute value lies in the range 3 ps/nm·km to 5.5 ps/nm·km within the wavelength range of 1530 nm to 1600 nm, and with chromatic dispersion slope of absolute value less than 0.04 ps/nm²·km within the wavelength range of 1530 nm to 1600 nm.

It would also be possible to select negative chromatic dispersion and positive chromatic dispersion slope in the wavelength range of the multiplex, or indeed positive chromatic dispersion and negative chromatic dispersion slope in the wavelength range of the multiplex.

In any event, low values for the dispersion slope ensure that the channels of the multiplex are transmitted without significant differences in transmission characteristics. In addition, these dispersion slope values ensure that the fiber of the invention also presents low dispersion values around 1300 nm, thus making it possible to use the fiber around that wavelength value as well.

The fiber of the invention preferably also presents, in the wavelength range of the multiplex, chromatic dispersion having a slope of absolute value less than 0.03 ps/nm²·km. Such a value presents the advantage of limiting distortion between the different channels of the comb.

The fiber preferably presents low chromatic dispersion at 1300 nm, and typically chromatic dispersion having an absolute value of less than 7 ps/nm·km.

The other propagation characteristics of the fiber of the invention can be selected to lie within the ranges of values that are conventional for NZ-DSF fibers, e.g.:

attenuation of less than 0.25 dB/km; and bending losses of less than 0.5 dB/km when wound around a radius of 30 mm.

Figure 3A:
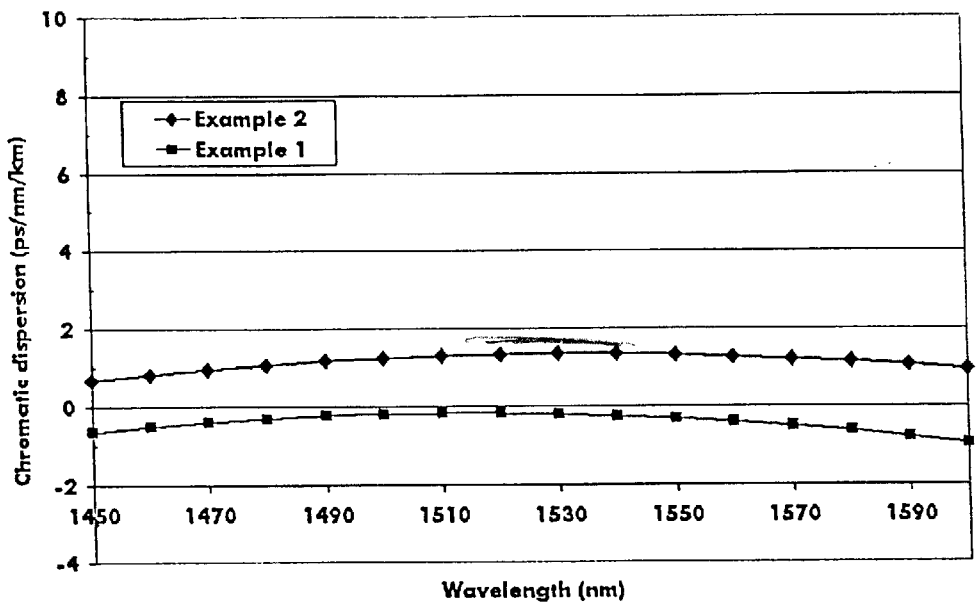
FIG. 3a illustrates the dispersion curves of the fibers of the invention.
Figure 3B:
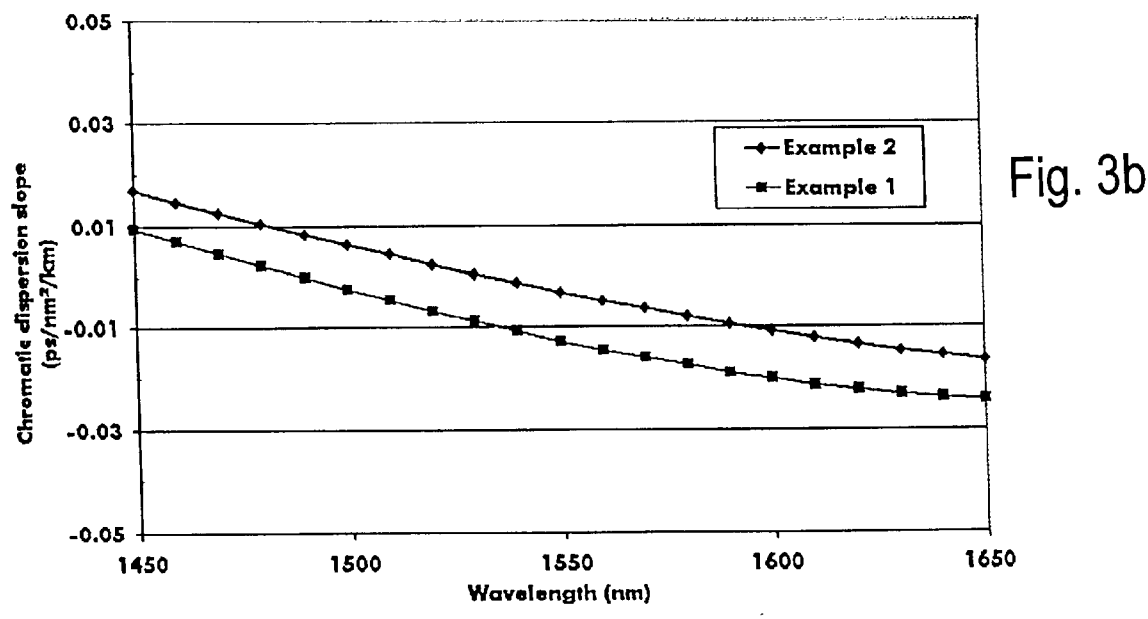

An embodiment of the invention is described below with reference to FIG. 1 which shows one example of an index profile for a fiber of the invention. The index profile of FIG. 1 is a rectangle-and-ring index profile. The dispersion curve for this example (Example 1) is shown in FIG. 3a, and the dispersion slope curve for Example 1 is shown in FIG. 3b. Starting from the center of the fiber and going out towards the cladding, this profile presents a central portion 1 of substantially constant index $n_1$ out to a radius $a_1$. The index $n_1$ is greater than the index $n_s$ of the silica constituting the cladding 4. In the embodiment of FIG. 1, the difference $\Delta n_1$ between index $n_1$ and the cladding index is $10\times10^{-3}$, and the radius $a_1$ is 2.7 µm.

Figure 2:
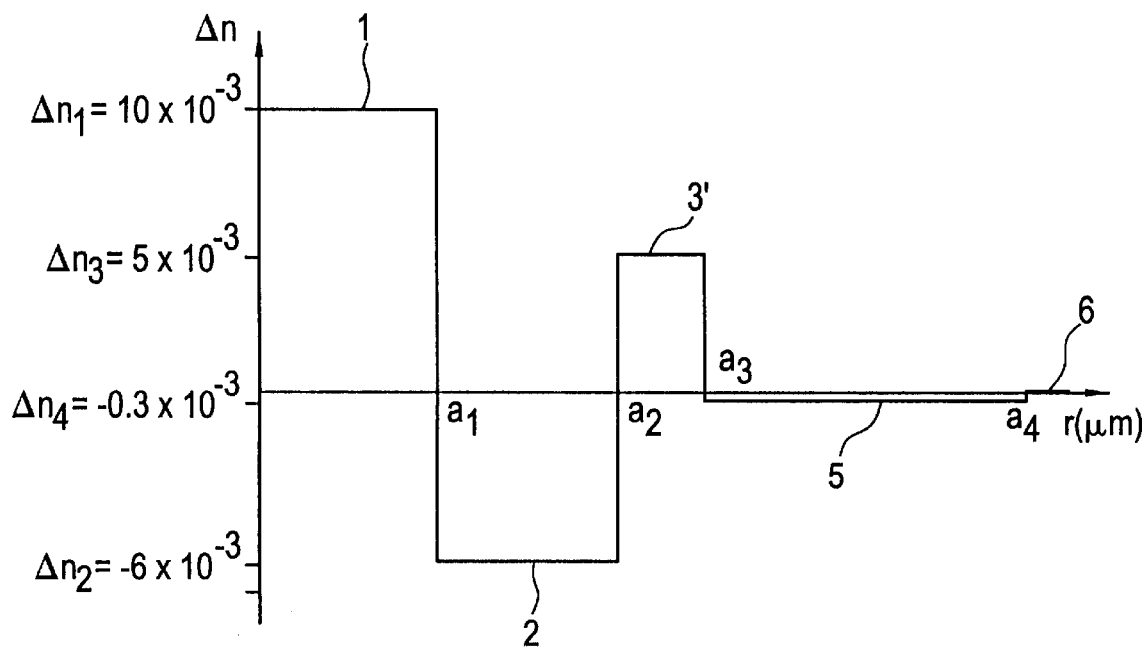
FIG. 2 is another example of an index profile for a fiber of the invention.

Around this rectangular central portion of index greater than that of the cladding, the fiber of the invention presents a buried ring portion 2 of index $n_2$ which is less than that of the cladding 4 extending between radii $a_1$ and $a2$. In the embodiment of FIG. 2, the difference $\Delta n_2$ between the index $n_2$ and the cladding index is $-6\times10^{-3}$, and the buried portion 2 extends over a thickness of 2.7 µm.

Around the buried portion, the fiber presents a ring 3 of index $n_3$ which is greater than the index of the cladding 4, and which extends between radii $a_2$ and $a_3$. In the embodiment of FIG. 1, the difference $\Delta n3$ between the index $n_3$ of the ring 3 and the index of the cladding 4 is $3.2\times10^{-3}$, and the ring has a thickness of 1.35 µm such that the radius $a_3$ is 6.75 µm.

This choice of index profile ensures that, in the range 1300 nm to 1600 nm, the chromatic dispersion slope remains less than 0.05 ps/nm²·km. More precisely, chromatic dispersion in this example presents a maximum value of $-0.6$ ps/nm·km at a wavelength of 1500 nm.

The fiber of FIG. 1 presents the following values for chromatic dispersion, given in ps/nm·km:

| 1450 nm | 1500 nm | 1550 nm | 1600 nm |
|---|---|---|---|
| −0.7 | −0.6 | −0.95 | −1.8 |

In the example of the figure, the chromatic dispersion maximum is reached for a negative value of the dispersion, and the chromatic dispersion is negative in the wavelength range of the multiplex.

FIG. 2 shows another example of an index profile of the invention. In the embodiment of FIG. 2, the index profile is a rectangle-and-ring profile as in FIG. 1, however it also has a buried portion around the ring. Starting form the center of the fiber and going out towards the cladding, this profile presents a central portion 1 of substantially constant index $n_1$ out to a radius $a_1$. The index $n_1$ is greater than the index $n_s$ of the silica of the cladding 6. In the embodiment of FIG. 2, the difference $\Delta n_1$ between the index $n_1$ and the cladding index is $10\times10^{-3}$.

Around this rectangular central portion of index greater than that of the cladding, the FIG. 2 fiber presents a buried annular portion 2 of index $n_2$ less than that of the cladding and extending between radii $a_1$ and $a_2$. In the embodiment of this figure, the difference $\Delta n_2$ between the index $n_2$ and the index of the cladding 6 is $-6\times10^{-3}$.

Around the buried portion, the fiber presents a ring 3' of index $n_3$ greater than that of the cladding 6, and extending between radii $a_2$ and $a_3$. In the embodiment of FIG. 2, the difference $\Delta n_3$ between the index $n_3$ of the ring 3' and the index of the cladding 6 is $5\times10^{-3}$.

Around the ring the fiber presents another buried portion 5 between radii $a_3$ and $a_4$, and of index $n_4$ less than the index of the cladding 6 and greater than the index of the buried portion 2 that extends between the rectangle and the ring. In the example of FIG. 2, the difference $\Delta n_4$ between the index $n_3$ of the ring 3' and the index of the cladding 6 is $-0.3\times10^{-3}$.

Possible radii for these index values advantageously satisfy the following relationships:

$$a_2 = 2 \cdot a_1$$

$$a_3 = 5 \cdot a_1/2$$

$$a_4 = 9 \cdot a_1/2$$

With these relationships between the radii, and for two different values of the radius $a1$ of the rectangle portion, chromatic dispersion values are obtained as specified in ps/nm·km in the following table:

|  | 1450 nm | 1500 nm | 1550 nm | 1600 nm | 1650 nm |
|---|---|---|---|---|---|
| $a_1$ = 2.8 µm | 0.6 | 1.2 | 1.3 | 1.1 | 0.7 |
| $a_1$ = 2.9 µm | 3.9 | 4.9 | 5.5 | 5.8 | 5.7 |

In both cases, dispersion values in the wavelength range 1450 nm to 1650 nm are positive and a dispersion maximum lies within this range. The dispersion curves for both of these cases (Examples 2 and 3) are illustrated in FIG. 3a and the dispersion slope curves are shown in FIG. 3b.

Index values other than those given in the example of FIG. 2 can also be selected. For the following index values:

$$\Delta n_1 = 10 \times 10^{-3}$$

$$\Delta n_2 = -7 \times 10^{-3}$$

$$\Delta n_3 = 5 \times 10^{-3}$$

$$\Delta n_4 = -0.3 \times 10^{-3}$$

the dispersion values given in the following table in ps/mn·km are obtained for two values of the radius $a_1$:

|  | 1450 nm | 1500 nm | 1550 nm | 1600 nm | 1650 nm |
|---|---|---|---|---|---|
| $a_1$ = 2.8 µm | 0.8 | 1 | 0.7 | −0.1 | −1.3 |
| $a_1$ = 2.9 µm | 4.2 | 5.1 | 5.5 | 5.3 | 4.7 |

In the first case, the maximum is achieved around 1500 nm, and dispersion values are positive and then negative. In the second case, the maximum is reached around 1550 nm, and the dispersion values are positive throughout the range of the comb.

For the following index values:

$$\Delta n_1 = 10 \times 10^{-3}$$

$$\Delta n_2 = -7 \times 10^{-3}$$

$$\Delta n_3 = 3 \times 10^{-3}$$

$$\Delta n_4 = -0.3 \times 10^{-3}$$

dispersion values are obtained as given in ps/nm·km in the following table for two values of the radius $a_1$:

|  | 1450 nm | 1500 nm | 1550 nm | 1600 nm | 1650 nm |
|---|---|---|---|---|---|
| $a_1$ = 2.8 µm | 3.8 |  | 5 |  | 4 |
| $a_1$ = 2.9 µm |  | 7.3 | 8.5 | 9.4 | 9.3 |

The maximum is reached around 1550 nm in the first case and around 1600 nm in the second case.

In all cases, these examples of fiber enable the invention to be implemented. In general, the invention can be obtained by a combination of the following characteristics:

$$13 \times 10^{-3} \leq \Delta n_1 - \Delta n_2 \leq 17 \times 10^{-3}$$

$$-8 \times 10^{-3} \leq \Delta n_3 \leq 6 \times 10^{-3}$$

$$3 \times 10^{-3} \leq \Delta n_3 \leq 6 \times 10^{-3}$$

$$a_1 \leq 3 \, \mu m$$

$$0.8 \leq (a_2 - a_1)/a_1 \leq 1.2$$

$$0.3 \leq (a_3 - a_2)/a_1 \leq 0.7$$

In the embodiment of FIG. 2, it is also preferable for:

$$1.5 \leq (a_4 - a_3)/a_1 \leq 2.5 \text{ and}$$

$$-0.5 \times 10^{-3} \leq \Delta n_4 \leq -0.1 \times 10^{-3}$$

In the example of FIGS. 1 and 2, $(a_2-a_1)/a_1$ is 1 and $(a_3-a_2)/a_1$ is 0.5. In the example of FIG. 2, $(a_4-a_3)/a_1$ is 2. In both examples, $(a_2-a_1)/a_1$ is 1 and $(a_3-a_2)/a_1$ is 0.5.

The invention can be manufactured by the person skilled in the art using conventional techniques such as MCVD or other techniques commonly used for manufacturing optical fibers.

Naturally, the invention is not limited to the embodiments described and shown. The profile in the figures and the other profiles given in the description are merely examples enabling the invention to be implemented. Other profiles can also make it possible to achieve the slope and dispersion values proposed by the invention.

In the above description, consideration has been given to chromatic dispersion values in the wavelength range 1400 nm to 1650 nm. The presence of a dispersion maximum in this range does not prejudge the variations in dispersion outside the range.

What is claimed is:

1. A dispersion shifted monomode optical fiber which, in a wavelength range of 1400 nim to 1650 nm, presents both a chromatic dispersion maximum and a chromatic dispersion slope of absolute value less than 0.05 ps/nm²·km; and wherein said maximum chromatic dispersion has a dispersion slope equal to zero.

2. The fiber of claim 1, wherein the maximum is the sole maximum in the wavelength range 1400 nm to 1650 nm.

3. The fiber of claim 1, presenting chromatic dispersion having a positive value at said maximum.

4. The fiber of claim 3, wherein said maximum is reached at a wavelength lying in the range 1530 nm to 1580 nm.

5. The fiber of claim 3, presenting a chromatic dispersion zero for a wavelength of less than 1450 nm.

6. The fiber of claim 3, presenting a chromatic dispersion zero for a wavelength greater than 1600 nm.

7. The fiber of claim 1, presenting chromatic dispersion having a value that is negative at said maximum.

8. The fiber of claim 7, wherein said maximum is reached at a wavelength lying in the range 1480 nm to 1520 nm.

9. The fiber of claim 1, wherein, in the wavelength range 1530 nm to 1580 nm, said chromatic dispersion slope is positive.

10. The fiber of claim 1, wherein, in the wavelength range 1530 nm to 1580 nm, said chromatic dispersion slope is negative.

11. The fiber of claim 1, wherein, in the wavelength range 1530 nm to 1580 nm, said chromatic dispersion slope has an absolute value less than 0.03 ps/mn²·km.

12. The fiber of claim 1, wherein, at a wavelength of 1300 nm, chromatic dispersion has an absolute value of less than 7 ps/nm·km.

13. The fiber of claim 1, presenting an index profile having a fiber core and cladding, the core comprising a central portion of index $n_1$ greater than the index $n_s$ of the cladding of the fiber, an annular portion around said central portion and having an index $n_2$ less than the index of the cladding, and a ring around said annular portion of index $n_3$ greater than that of the cladding.

14. The fiber according to claim 13, further presenting another annular portion around said ring, and having an index $n_4$ less than that of the cladding.

15. The fiber according to claim 14, wherein the difference $\Delta n_4$ between the index $n_4$ of the other annular portion and the index $n_s$ of the cladding lies in the range $-0.5 \times 10^{-3}$ and $-0.1 \times 10^{-3}$.

16. The fiber of claim 13, wherein the difference between the indices of the central portion and the annular portion lies in the range $13 \times 10^{-3}$ to $17 \times 10^{-3}$.

17. The fiber of claim 13, wherein the difference $\Delta n_2$ between the index $n_2$ of the annular portion and the index $n_s$ of the cladding lies in the range $-8 \times 10^{-3}$ to $-6 \times 10^{-3}$.

18. The fiber of claim 13, wherein the difference $\Delta n_3$ between the index $n_3$ of the ring and the index $n_s$ of the cladding lies in the range $3 \times 10^{-3}$ and $6 \times 10^{-3}$.

19. The fiber of claim 13, wherein the radius $a_1$ of the central portion is less than or equal to 3 $\mu$m.

20. The fiber of claim 13, wherein the ratio $(a_2-a_1)/a_1$ between the thickness of the annular portion and the radius of the central portion lies in the range 0.8 to 1.2.

21. The fiber of claim 13, wherein the ratio $(a_3-a_2)/a_1$ between the thickness of the ring and the radius of the central portion lies in the range 0.3 to 0.7.

22. The use of the fiber according to claim 1 for wavelength division multiplexed transmission systems.

* * * * *